(12) United States Patent
Breckenridge

(10) Patent No.: US 8,374,335 B2
(45) Date of Patent: ***Feb. 12, 2013

(54) METHOD AND SYSTEM FOR AN INTELLIGENT TELEPHONE PREFIX DIALER

(76) Inventor: John L. Breckenridge, Arlington, VA (US)

( * ) Notice: Subject to any disclaimer, the term of this patent is extended or adjusted under 35 U.S.C. 154(b) by 1502 days.

This patent is subject to a terminal disclaimer.

(21) Appl. No.: 11/526,396

(22) Filed: Sep. 25, 2006

(65) Prior Publication Data

US 2007/0121913 A1    May 31, 2007

Related U.S. Application Data

(62) Division of application No. 09/525,566, filed on Mar. 15, 2000, now Pat. No. 7,113,585.

(51) Int. Cl.
*H04M 1/00* (2006.01)
*H04M 3/00* (2006.01)

(52) U.S. Cl. ......... 379/355.05; 379/355.02; 379/355.04; 379/355.08

(58) Field of Classification Search ............. 379/355.06, 379/355.07, 355.02, 355.04, 355.05, 355.08; 455/445, 564

See application file for complete search history.

(56) References Cited

U.S. PATENT DOCUMENTS

| | | | | |
|---|---|---|---|---|
| 3,967,250 A * | 6/1976 | Senda et al. | ....................... | 714/3 |
| 3,974,343 A * | 8/1976 | Cheney et al. | ................. | 379/244 |
| 4,256,926 A * | 3/1981 | Pitroda et al. | ................. | 379/269 |
| 4,736,405 A * | 4/1988 | Akiyama | ................... | 379/88.11 |
| 5,157,719 A | 10/1992 | Waldman | | |
| 5,247,571 A * | 9/1993 | Kay et al. | ................. | 379/221.09 |
| 5,259,026 A * | 11/1993 | Johnson | ................... | 379/216.01 |
| 5,272,748 A * | 12/1993 | Davis | ............................ | 455/465 |
| 5,274,693 A * | 12/1993 | Waldman | ...................... | 455/564 |
| 5,309,508 A | 5/1994 | Rosen | | |
| 5,353,331 A * | 10/1994 | Emery et al. | ................... | 455/461 |
| 5,359,646 A * | 10/1994 | Johnson et al. | ............. | 379/27.02 |
| 5,394,463 A * | 2/1995 | Fischell et al. | ............ | 379/211.02 |
| 5,402,481 A * | 3/1995 | Waldman | ................. | 379/355.01 |
| 5,539,884 A * | 7/1996 | Robrock, II | .................... | 709/227 |
| 5,644,633 A | 7/1997 | Kaufeld et al. | | |
| 5,691,973 A * | 11/1997 | Ramstrom et al. | ............ | 379/252 |
| 5,722,088 A * | 2/1998 | Storn et al. | ..................... | 455/564 |
| 5,758,286 A * | 5/1998 | Leppanen | ..................... | 455/445 |
| 5,859,896 A | 1/1999 | Rosen | | |
| 6,285,753 B1 * | 9/2001 | Slusher | .................... | 379/355.06 |
| 6,343,125 B1 | 1/2002 | Yablon | | |
| 6,449,475 B1 * | 9/2002 | Chinnaswami | ............... | 455/415 |
| 6,449,497 B1 * | 9/2002 | Kirbas et al. | .................. | 455/564 |
| 6,751,311 B1 | 6/2004 | Arnold et al. | | |
| 6,940,965 B1 | 9/2005 | Arnold et al. | | |
| 7,103,168 B2 | 9/2006 | Bedingfield, Sr. et al. | | |

* cited by examiner

*Primary Examiner* — Gerald Gauthier
*Assistant Examiner* — Simon King

(57) ABSTRACT

Method and system for an Intelligent Prefix Dialer eliminates the necessity for manually dialing an area code as a prefix to a call in telephone systems in which such action is a requirement. The Intelligent Prefix Dialer can be resident in a service provider's Advanced Intelligent Network (AIN) and is capable of analyzing the dialing sequence from the caller's Customer Premise Equipment (CPE) to determine when the caller wishes to dial seven digits. In the event that the caller has dialed seven digits or less, the present invention can append the abbreviated digits the caller has dialed to a caller defined default prefix, in order to form a complete telephone number to be used by the telephone network to establish the connection to a called party.

20 Claims, 19 Drawing Sheets

INTELLIGENT TELEPHONE PREFIX DIALER PSEUDOCODE

Version Beta 3.0

Subroutines
    DISPLAYPREFIX@
  LINEMONITOR@
    MONITORLINE@
    CAPTUREDIGITS@
    CAPOPTIONSTRINGS@
    CAPREFIXSTRING@
    FLASHLINE@
    GETNDX@
    CHECK_FOR_TEN@
    DIALNUMBER@
    PARSEOPTIONS@
    PARSESTRING@

Data

| Name | Description |
|---|---|
| LENGTH | /* length of table*/ |
| TABLE | /*start of table*/ |
| SUM | /*sum of digits*/ |
| COUNT | /*count of digits*/ |
| TELNO(8) | /*user dialed digits*/ |
| PREFIX | /*user defined dial prefix*/ |
| DIALTONE_FLAG | /*Flag to indicate line state */ /* On Hook = 0, Off Hook = 1*/ /* Line one to Off Hook Line two*/ |
| DIAL_STRING(10) | /*The reparsed dial string necessary to complete */ /* the call*/ |
| USER_REQUEST_FLAG | /*Flag to initiate user input of prefix code*/ |
| NDX | /*# Pointer for user TELNO entries /*intoDIALSTRING*/ |
| NUMBER_OF_DIGITS_CAPTURED | /*number of digits received by dtmf receiver before*/ /*timeout*/ |
| ON_HOOK_TIME_COUNTER | /*amount of time that receiver is on hook*/ |
| BYPASS | /*bypass bit, if set to 1, bypasses flashook 2 and 3*/ |

Figure 6a

```
Program MAIN
                                                    /*Declare and initialize all variables*/
Declare and Intitilize Hardware specific variables for dtmf transceiver and other hardware
Dtmf                              var      byte
Bypass                            var      byte
Dt_flag                           var      bit
Dt_det                            var      INL.bit2     /*Detect bit from dtmf receiver*/
Dialtone_flag      var    bit
Number_of_Digits_Captured         var      byte         /*Range index to telno()*/
Digit           var    byte                 /*Index of digits to dial by autodialer*/
I               var    word
L               var    byte
K               var    bit
Ndx             var    nib
Gosub  GETNDX             /*Get ndx from EEPROM*/
For I = 1 to ndx - 1
Get prefix code from EEPROM and place into dial_string(I)
next
GOSUB DISPLAYPREFIX   /*Show the stored dialing prefix*/
CAPDIGITS:
          GOSUB CAPTUREDIGITS  /*Start listening for dial string digits entered by user*/
                If NUMBER_OF_DIGITS_CAPTURED <> (10 – NDX) + 1 then
                     goto INHIBITDIAL
                fi
      GOSUB PARSESTRING           /*Parse the TELNO() into DIAL_STRING()*/
              Pause 160                     /*Time delay before initiating flash hook sequence*/
          GOSUB FLASHLINE         /*First Flash hook*/
              Pause 700                     /*Time delay before further action*/
              If BYPASS =1 then GOTO SKIP_FLASHES  /*2$^{nd}$ and 3$^{rd}$ flash only necessary for 3
                                                   /*way call*/
          GOSUB FLASHLINE         /* 2nd Flash hook*/
              Pause 700                     /*Time delay before further action*/
          GOSUB FLASHLINE         /* 3$^{rd}$ Flash hook*/
              Pause 700                     /*Time delay before further action*/
```

Figure 6b

SKIP_FLASHES:
    pause 700    /*Time delay before initiate redial*/
    GOSUB DIALNUMBER    /*Dial the number with the required prefix*/
INHIBITDIAL:
    GOSUB LINEMONITOR    /*Stay put until line goes onhook*/
    GOSUB MONITORLINE    /*Stay put until line goes offhook*/

GOTO CAPDIGITS    /*Start listening for digits again*/

/*******************************************************************/

SUBROUTINE:LINEMONITOR
LOOPDT1:
    Set DIALTONE_FLAG from (Telephone Line) /*0 is ONHOOK, 1 is OFFHOOK*/
        IF DIALTONE_FLAG indicates OFFHOOK then GOTO LOOPDT1
    Return

/*******************************************************************/

/*******************************************************************/

SUBROUTINE:MONITORLINE
    Initialize ON_HOOK_TIME_COUNTER to Zero
LOOPDT2:
    Set DIALTONE_FLAG from (Telephone Line) /*0 is ONHOOK, 1 is OFFHOOK*/
        IF DIALTONE_FLAG indicates ONHOOK then
          Do
            Increment ON_HOOK_TIME_COUNTER
            GOTO LOOPDT2
          Done
        fi
        IF ON_HOOK_TIME_COUNTER > 800 then set BYPASS to 1
        fi
    Return
/*******************************************************************/

SUBROUTINE: CAPTUREDIGITS

CAPTUREDIGITS:

SETUP dtmf hardware for dtmf READ

For I = 1 to 1700   /*Initialize Interdigit count down timer*/

Get DIALTONE_FLAG from (Telephone Line) /*If not still OFFHOOK then EXIT to MAIN*/

If DIALTONE_FLAG = 0 then GOTO MAIN fi

POLL for dtmf tone from (DTMF RECEIVE CHIP)

If tone not detected then NEXT I       /*Increment Interdigit count down timer*/ else

Increment NUMBER_OF_DIGITS_CAPTURED

If NUMBER_OF_DIGITS_CAPTURED > (10 – NDX) + 1 then GOTO MAIN

/*user dialed more than */

/*prefix digits plus user digits and does not need help here */

READ dtmf tone into variable DTMF

TELNO(NUMBER_OF_DIGITS_CAPTURED) = DTMF

NEXT I

/*Interdigit Timer has timed out, Check for number of digits received*/

IF NUMBER_OF_DIGITS_CAPTURED < (10 – NDX) + 1 then

Do

If telno(1) = 12 and telno(2) = 1 then

Do                           /*User has requested to input options*/

Gosub PARSEOPTIONS

Goto MAIN              /*Initialize with new user options*/

Done

Set NUMBER_OF_DIGITS_CAPTURED = 0

Done

Return

/******************************************************************/

SUBROUTINE: PARSESTRING

For j = NDX to 10

DIAL_STRING(j) = TELNO(j – (NDX – 1))

Next j

Return               /****************/

Figure 6d

SUBROUTINE: FLASHLINE
  Go ONHOOK
  Pause 600 msec   '600 milliseconds, nominal, can be between 400 and
        '700ms
  Go OFFHOOK
 Return
/************************************************************/
/************************************************************/
SUBROUTINE: DIALNUMBER
 IF PRIVACY_BIT = 1 then
  Do
   DTMFOUT(*67)  /*Dial the Caller ID Block Code */
  Done
 IF PRIVACY_BIT = 0 then
  Do
   DTMFOUT(*82)  /*Dial the Caller ID Send Code*/
  Done
 IF ONE_PLUS_BIT = 1 then
  Do
   DTMFOUT(1)  /*Dial 1 before the area code, etc*/
  Done
 For DIGIT = 1 to 10
 DTMFOUT(DIALSTRING(DIGIT)) /*Dial the prefix code and the rest of the
        /*phone number*/
 Return
/************************************************************/
/************************************************************/
SUBROUTINE: PARSEOPTIONS
 Write to DisplayDevice("PRIVACY?: Y/N) /*Prompt for user to turn Call ID Block ON or */
       /*OFF*/
 Gosub CAPOPTIONSTRINGS /*Get user input*/
 Write user input to EEPROM
 Read user input from EEPROM
 Write user input from EEPROM to DisplayDevice /*User selection confirmed on */
       /*DisplayDevice*/

Figure 6e

```
Write to DisplayDevice("1 PLUS ON?: Y/N) /*Prompt for user to turn 1 PLUS Dialing
                                                                /*ON or OFF*/
        Gosub CAPOPTIONSTRINGS       /*Get user input*/
        Write user input to EEPROM
        Read user input from EEPROM
        Write user input from EEPROM to DisplayDevice /*User selection confirmed on*/
                                                                /*DisplayDevice*/
        Write to DisplayDevice("ENTER PREFIX# ) /*Prompt for user to enter dialing prefix*/
        Gosub CAPREFIXSTRING         /*Get user input of dialing prefix*/
        Write user input to EEPROM
        While user input from EEPROM <> 12
           Do
              Read user input from EEPROM
              Gosub CHECK_FOR_TEN
              Write user input from EEPROM to DisplayDevice /*User entry confirmed on*/
                                                                /*DisplayDevice*/
    Done
        Return
/******************************************************************/
SUBROUTINE: DISPLAYPREFIX
        READ PrefixData from EEPROM
        WRITE PrefixData from EEPROM to DisplayDevice
Return
/******************************************************************/
SUBROUTINE: CAPOPTIONSTRINGS
        For I =1 to 1900          /* Time out if no user input*/
           When data present from DTMFreceiver
        Do
                READ data from DTMFreceiver into option_bit
                Return
            Done
        Next
Return
/******************************************************************/
```

Figure 6f

SUBROUTINE: CAPREFIXSTRING

Mu = 0

For I =1 to 1900        /* Time out if no user input*/

When data present from DTMFreceiver

Do

Mu = mu + 1

READ data from DTMFreceiver into telno(mu)

If telno(mu) = 12 or mu > 7 then

Return fi done

Next

Return

/****************************************************************/

SUBROUTINE: GETNDX for i = 1 to 7 read from start of prefix data from EEPROM into digit if digit = 12 then ret_ndx next return ret_ndx:

ndx = I return

/****************************************************************/

SUBROUTINE: CHECK_FOR_TEN if telno(i) = 10 then zeroit return zeroit:

telno(i) = 0                            /*Format output for DisplayDevice*/ return

/****************************************************************/

Programmer Application Notes:

1. Actual programming language used was Parallax, Inc. PBASIC
2. Processor used was the Parallax, Inc. BASIC Stamp II, BS2-IC

Figure 6g

3. The Pause instruction argument is in milliseconds
4. The processor clock speed is approximately 20MHZ
5. The PBASIC interpreter executes approximately 3000 instructions per second, i.e. 0.3 milliseconds per instruction. Use the 0.3 milliseconds/instruction value to calculate timeouts and delays that are implemented using loops.
6. Contact the inventor for future development and application notes.

Figure 6h

*Intelligent Prefix Dialer Integrated into Service Provider's Advanced Intelligent Network Equipment*

User Options Recording at SCP

METHOD AND SYSTEM FOR AN INTELLIGENT TELEPHONE PREFIX DIALER

1.1. RELATED U.S. PATENT DOCUMENTS

This is a divisional application claiming the benefit of U.S. patent application Ser. No. 09/525,566 filed on Mar. 15, 2000, now U.S. Pat. No. 7,113,585, which is hereby incorporated herein by reference in its entirety.

1.2. FIELD OF THE INVENTION

The invention relates to telephone communications, and more particularly to a method and system having the capability to append caller initiated abbreviated dial sequence to a caller defined default prefix, in order to form a complete telephone number to be used by the telephone network to successfully establish a connection to a called party, and for selectively activating the method and system.

1.3. DESCRIPTION OF RELATED ART

Local telephone calls have, for many years, been established by dialing a seven digit code. Most recently, however, the demand for telephone number assignments has increased dramatically due to subscriber's use of telephone lines for fax machines, and the internet as well as separate voice lines. New housing developments have also increased the demand for telephone number assignments.

One technological advance which promises to alleviate this problem for a number of years is to require a calling party to dial the area code of a called party even when the two parties are within a common area code. Thus, one would be required to dial a ten digit code even if the called party is next door. It will be readily apparent that this change is highly inconvenient to many persons who wish to continue the use of the traditional seven digit dialing for local calls.

Accordingly it will be understood that a method and system which, in such a contemplated modified telephone dialing system, permits the ongoing use of standard seven digit dialing for routine local calls would be highly desirable, and it is to this end that the present invention is directed.

1.4. SUMMARY OF THE INVENTION

A method and system for an Intelligent Prefix Dialer eliminates the necessity for manually dialing an area code as a prefix to a call in telephone systems in which such action is a requirement. The Intelligent Prefix Dialer can be resident in a service provider's Advanced Intelligent Network (AIN) and is capable of analyzing the dialing sequence initiated from the caller's Customer Premise Equipment (CPE) to determine when the caller wishes to dial seven digits. In the event that the caller has dialed and intended to dial seven digits or less, the present invention can append the abbreviated digits the caller has dialed to a caller defined default prefix, in order to form a complete telephone number that can be used by the telephone network to successfully establish the connection to a called party.

1.5. BRIEF DESCRIPTION OF THE DRAWINGS

FIG. 1 illustrates the connection between the calling subscriber's telephone or other equipment to the intelligent prefix dialer, the connection of the Intelligent prefix dialer to the telephone line at the subscriber's location, and the continuation of the telephone line to the central office, ultimately connecting to the called party's telephone or other equipment.

FIG. 2*a* is a schematic block diagram detailing the line interruption connection, the dtmf transceiver connection, and the line state detector connection to the subscriber's incoming telephone line. The schematic of FIG. 2*a* also shows the line interruption control circuit in block diagram format.

FIG. 2*b* is a schematic block diagram of an exemplary embodiment of the inventive apparatus.

FIGS. 6*a*-6*h* illustrate a pseudo code representation of the programmed instructions required to effect the functionality as described in the Detailed Description of the Invention.

Figure 7:
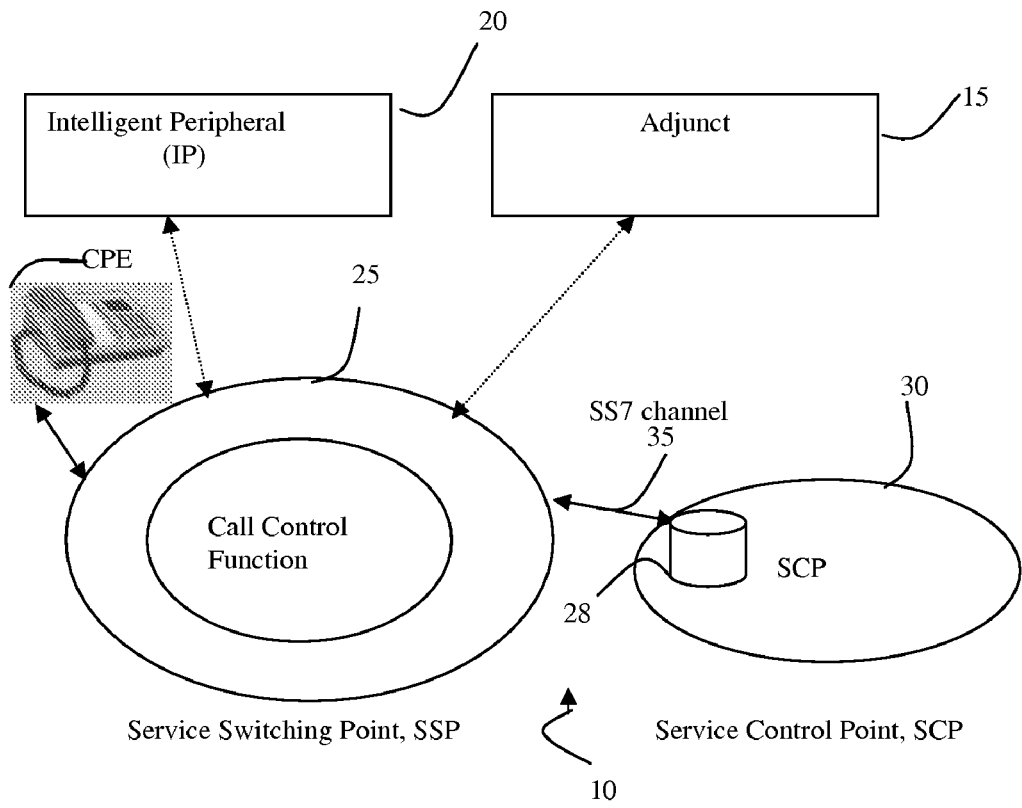

FIG. 7 is a pictorial block diagram representing an embodiment of the inventive method within the Service Provider's Advanced Intelligent Network (AIN) equipment, according to the present invention.

Figure 8:
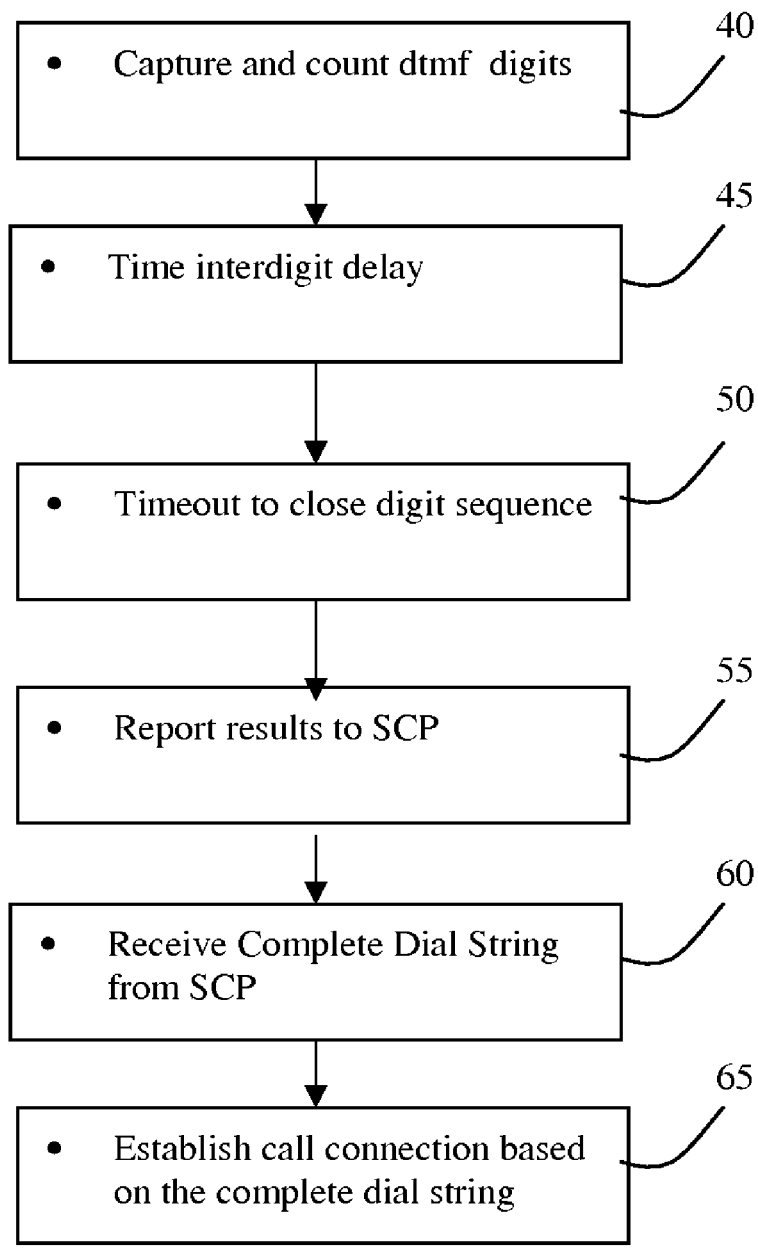

FIG. 8 is a call control flow diagram within the SSP and IP AIN elements, according to the present invention.

Figure 9:
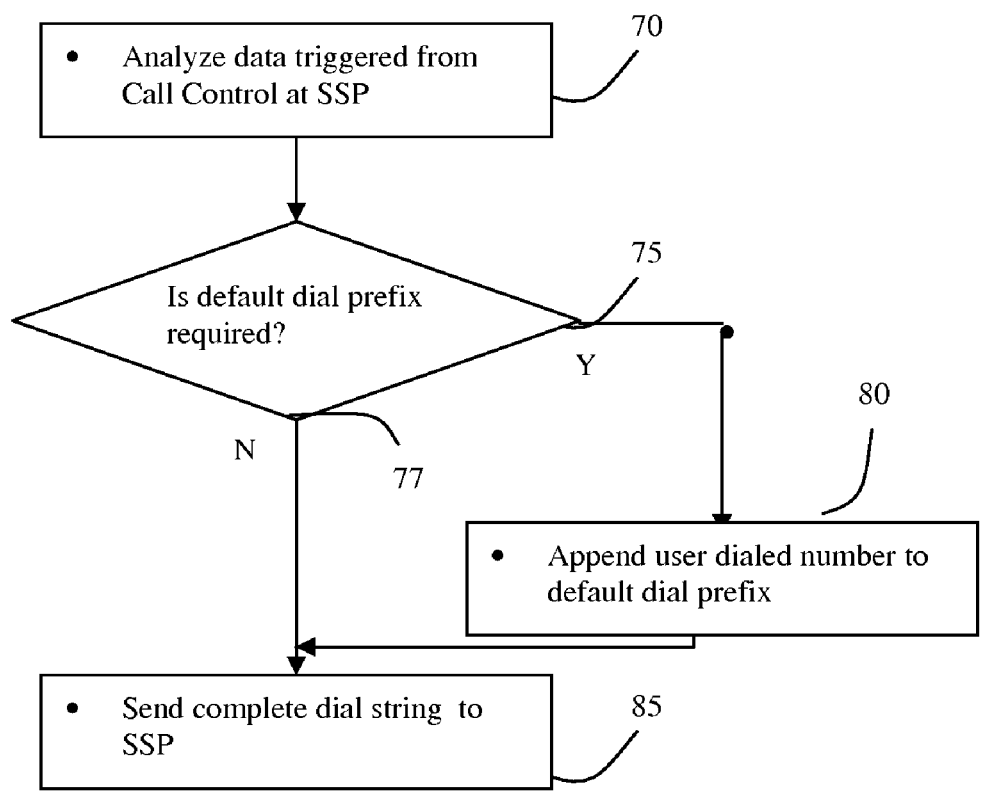

FIG. 9 is a control logic flow diagram within the SCP AIN element, according to the present invention.

Figure 10:
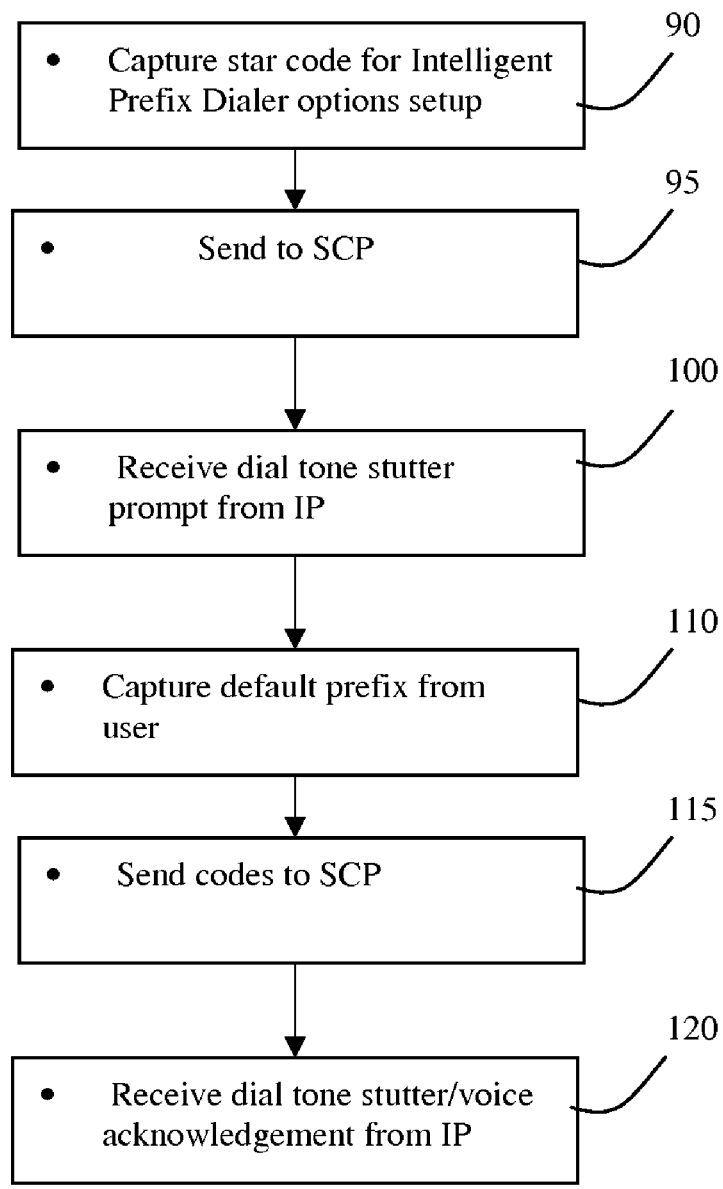

FIG. 10 is a flow diagram showing a user options interface implemented within the SSP/IP AIN elements, according to the present invention.

Figure 11:
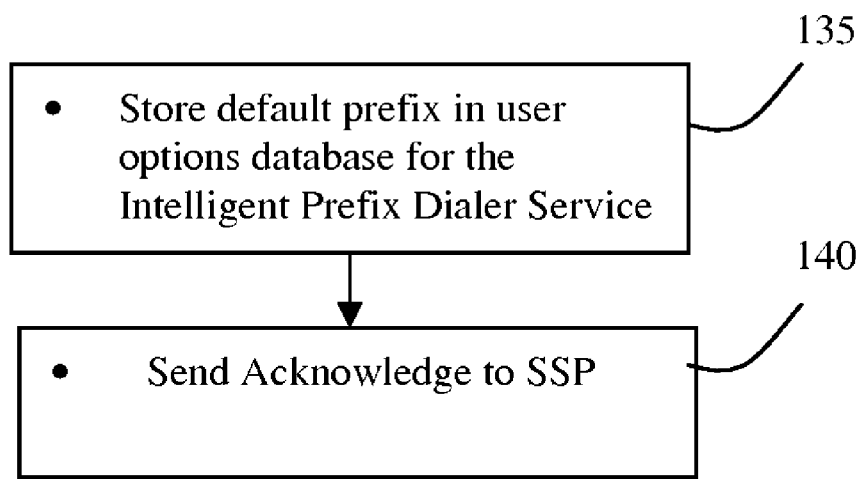

FIG. 11 is a flow diagram showing user options recording capability implemented within the SCP AIN element, according to the present invention.

1.6 DETAILED DESCRIPTION OF THE INVENTION

Most subscribers have a pattern of dialing that presupposes using a specific Numbering Plan Area number, (NPA) more frequently than any other overlayed NPA number. With my invention a subscriber designated NPA number can be stored for use with any seven digit number the subscriber dials. Moreover, if desired by the subscriber, an NPA-Nxx number may be stored in my invention, thus facilitating xxxx, 4 digit dialing by the subscriber for call completion.

The present invention can provide a method and system that is responsive to the 7 or less digit number dialed by the calling party, and eliminate the necessity for the calling party to dial any predetermined code, such as an area code, prior to entering the called party's local telephone number.

The method and system according to the present invention has the capability to store a user programmable predetermined code, such as e.g., an area code for on demand use when the user is dialing a phone number, such as, e.g., a seven digit dial sequence.

The present invention eliminates the necessity for manually dialing an area code as a prefix to a call in telephone systems in which such action is a requirement. The Intelligent Prefix Dialer can be resident in a service provider's Advanced Intelligent Network (AIN) and is capable of analyzing the dialing sequence initiated from the caller's Customer Premise Equipment (CPE) to determine when the caller wishes to dial seven digits.

In the event that the caller has dialed and intended to dial seven digits or less, the present invention can append the abbreviated digits the caller has dialed to a caller defined default prefix, in order to form a complete telephone number that can be used by the telephone network to successfully establish the connection to a called party. Thus, the caller can dial an abbreviated number of digits to successfully complete the call.

Figure 1:
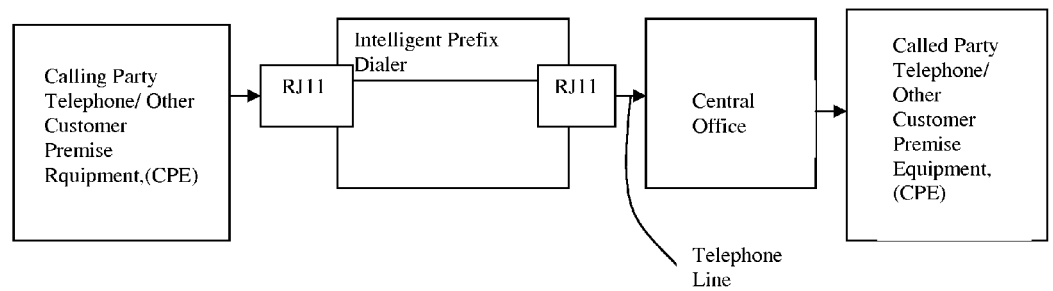

Referring to FIG. 1 for a description of a representative environment, note that the standalone embodiment of the intelligent telephone prefix dialer presupposes a standard telephone interface between the telephone line, the intelligent telephone prefix dialer, and the subscriber's telephone or other subscriber equipment.

Figure 2A:
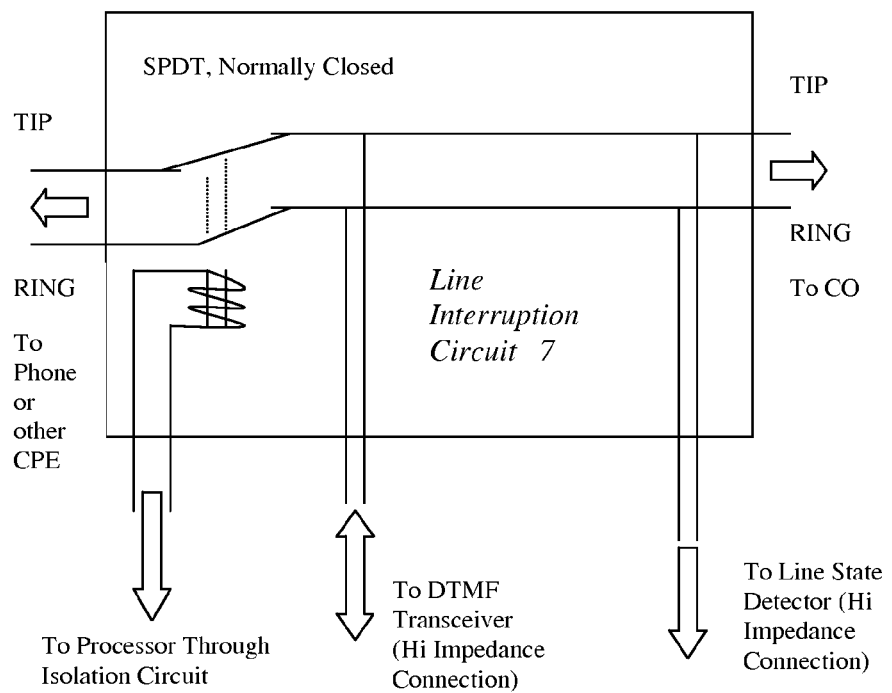
Figure 2B:
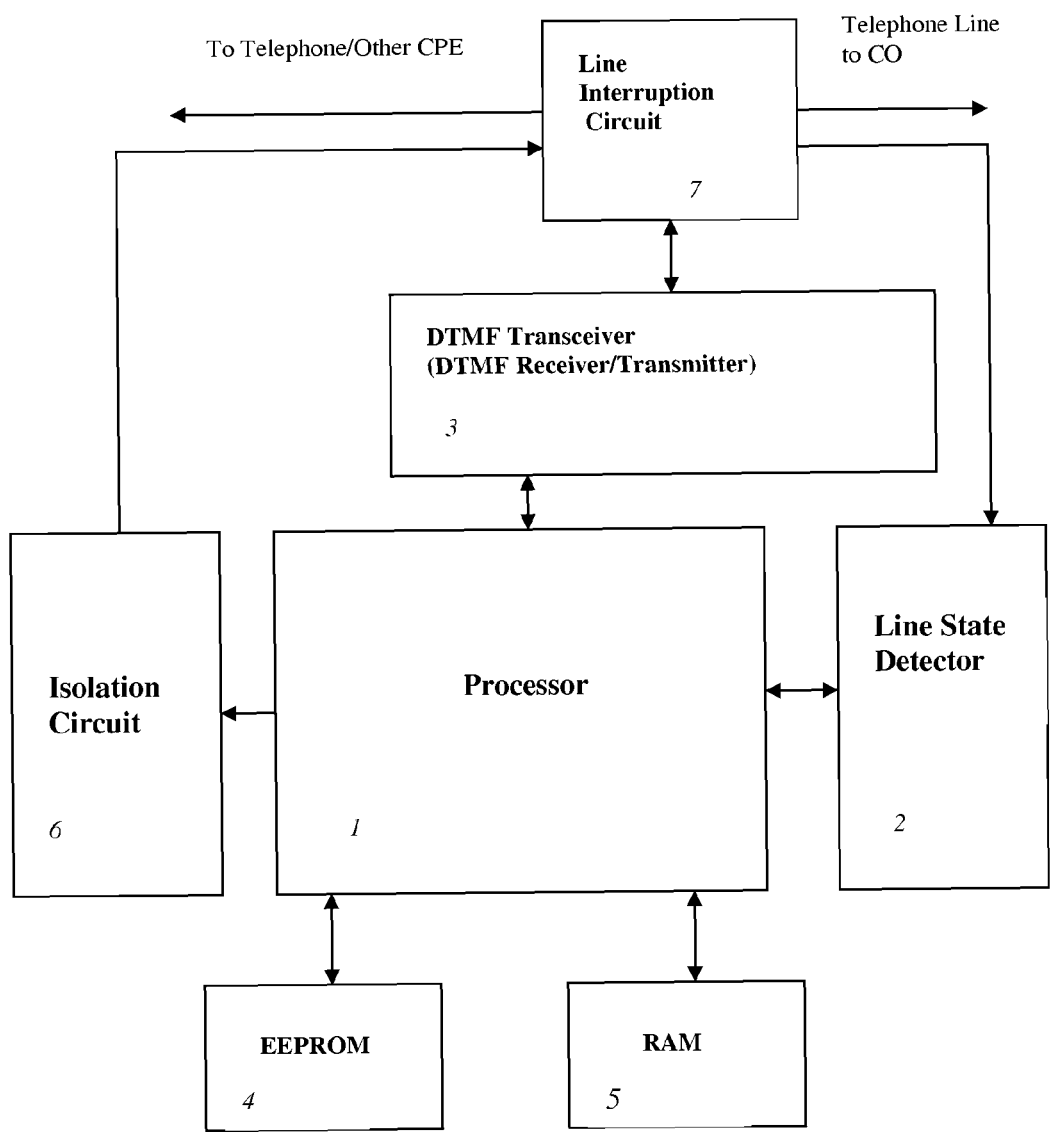

As shown in FIGS. 2a and 2b, it should be understood that absent a processor initiated line interruption, the normally closed configuration of line interruption circuit 7 allows a user to initiate a dial string on the telephone network contemporaneously with processing instructions being executed in the processor 1.

In FIG. 2b the line interruption circuit 7 is provided to create a hook switch flash upon a software request from the processor 1. The requisite control signal from the processor is transmitted through the isolation circuit 6. The isolation circuit is provided to isolate currents and voltages typically found in the type of relay that would be used in the line interruption circuit from the processor hardware, so that a much smaller voltage and or current may be used to effect relay activation at the line interruption circuit. Isolation circuit methods may vary and are known and understood by those skilled in the art.

As shown in FIG. 2a, the output of the dtmf transmitter 3, and the input of the dtmf receiver 3, are both connected to the tip and ring of the subscriber's telephone line in such a manner, (high impedance connection), as to not interfere with the telephone line, either looking towards the Central Office, or back to the subscriber's other Customer Premise Equipment, hereinafter, CPE. The processor 1 controls the dtmf transmitter to send dtmf data onto the subscriber's telephone line. The processor 1 controls the dtmf receiver to listen for dtmf data on the subscriber's telephone line.

In a similar fashion, the line state detector 2 input is connected to the tip and ring of the subscriber's telephone line, (high impedance connection). The line state detector 2 output is connected to the processor 1.

EEPROM 4 is connected to the processor for communication of non-volatile data such as the predefined dial prefix, to the processor, and the retention of programmed instructions regardless of power cycles or other dynamic environmental conditions which may be encountered by the inventive apparatus.

RAM 5 is connected to the processor for a scratchpad function to hold transient variable data such as the telephone number dialed by the subscriber.

Referring to FIGS. 6a 6h, the pseudo-code provides the methods required by the inventive apparatus to activate the components outlined in FIGS. 2a and 2b. Beginning with processor initialization, the required variable lengths and values are set upon power up of the intelligent telephone prefix dialer.

Referring to FIGS. 6a 6h for programmed instruction references and FIG. 2b for hardware component references, when the USER REQUEST FLAG is set, processing control transfers to the PARSEOPTIONS subroutine. All items and prompts displayed at the request of PARSEOPTIONS are done through subroutine DISPLAYPREFIX. The PARSEOPTIONS subroutine prompts the user if privacy is desired. If the user responds "Y" for yes then a flag is written to EEPROM which will be used to transmit a *67 as part of the user defined prefix dial string. If the user responds "N" for no then a flag is written to EEPROM which will be used to transmit a *82 as part of the user defined prefix dial string. After the user has responded, or if the user has not responded within a specified time period, The PARSEOPTIONS subroutine will display whether privacy is confirmed on or off.

Similarly PARSEOPTIONS will prompt whether the user desires "1+" dialing or not. If the user selects "1+" dialing, a dtmf 1 will be interspersed between the *67/*82 sequence and the rest of the predetermined prefix dial string.

Next PARSEOPTIONS prompts the user to enter a default dialing prefix and responds by writing this prefix into EEPROM. The default dialing prefix is then displayed to the user after the user has entered the dialing prefix or if he/she/ has not entered a dialing prefix within a specified time period, whatever default dialing prefix which was previously stored is displayed. PARSEOPTIONS then returns processing control to the MAIN processing routine.

Referring to FIG. 6 for programmed instruction references and FIG. 2b for hardware component references, subroutines LINEMONITOR, and MONITORLINE use the output of the line state detector, FIG. 2b 2, to trigger from on-hook line condition and off-hook line conditions, respectively. MONITORLINE also counts the amount of time that the line condition is on-hook, if the amount of time is above a threshold value then the on-hook time is flagged, BYPASS set to 1, to not be a flash hook, otherwise the line condition is a flash. LINEMONITOR is used to inhibit operations of the inventive apparatus until the line condition goes on-hook. This feature provides the functionality of permitting the subscriber to send dtmf digits over the network without interference from the inventive apparatus such as when the subscriber is interfacing with a remote automated attendant.

Referring to FIGS. 6a 6h for programmed instruction references and FIG. 2b for hardware component references, subroutine GETNDX reads the prefix data in EEPROM to determine the number of digits in the default prefix dial string. Sets an index appropriately then returns. As is shown in FIG. 6 the MAIN routine places the prefix code into the least significant part of the string to be dialed, then starts listening for subscriber dialed digits via the dtmf receiver by transferring control to subroutine CAPTUREDIGITS.

As shown in FIGS. 6a 6h the CAPTUREDIGITS routine inhibits further processing during the progress of the call if the number of subscriber digits captured does not equal (10−NDX)+1, NDX being 1 greater than the number of default prefix digits stored in EEPROM. The effect of this processing gives the subscriber control over when inventive apparatus will dial for the subscriber, for example, if the prefix is a three digit area code, the inventive apparatus will intervene to complete the call only if the subscriber has dialed a 7 digit number. When CAPTUREDIGITS has captured the subscriber digits and timed out, it returns to MAIN. If the required number of digits have been captured, processing continues to PARSESTRING.

Referring to FIGS. 6a 6h for programmed instruction references and FIG. 2b for hardware component references, subroutine PARSESTRING forms a resultant digit sequence by parsing together the default dial prefix and the dial string dialed by the subscriber, then returns to MAIN Referring to FIGS. 6a 6h for programmed instruction references and FIG. 2b for hardware component references, After PARSESTRING, the MAIN routine pauses for a predetermined amount of time then proceeds to effect a hook switch flash via a control signal to the line interruption circuit by calling subroutine FLASHLINE. Upon return MAIN pauses for a predetermined period of time then effects two more flash hooks if the subscriber has interrupted call progress to dial another number for three way calling activation, then processing continues; if the subscriber has not interrupted call progress to dial another number for three way calling activation, then two additional hook switch flashes are bypassed and processing continues.

Referring to FIGS. 6a 6h for programmed instruction references and FIG. 2b for hardware component references, MAIN transfers control to subroutine DIALNUMBER in order to dial the resultant digit sequence containing the complete telephone number with the required prefix by means of the dtmf transmitter. Subroutine DIALNUMBER first dials the Caller ID Block Code if the PRIVACY BIT is set or DIALNUMBER dials the Caller ID Send Code if the PRIVACY BIT is not set. Next, if the ONE PLUS BIT is set then DIALNUMBER dials a 1. Next, the default prefix code and the rest of the telephone number as parsed in PARSESTRING is dialed by DIALNUMBER to complete the call. DIALNUMBER then returns.

After processing returns from DIALNUMBER, the inventive apparatus remains quiescent until the subscriber is ready to dial another number.

ISDN and Analog Telephone Embodiments

Figure 3:
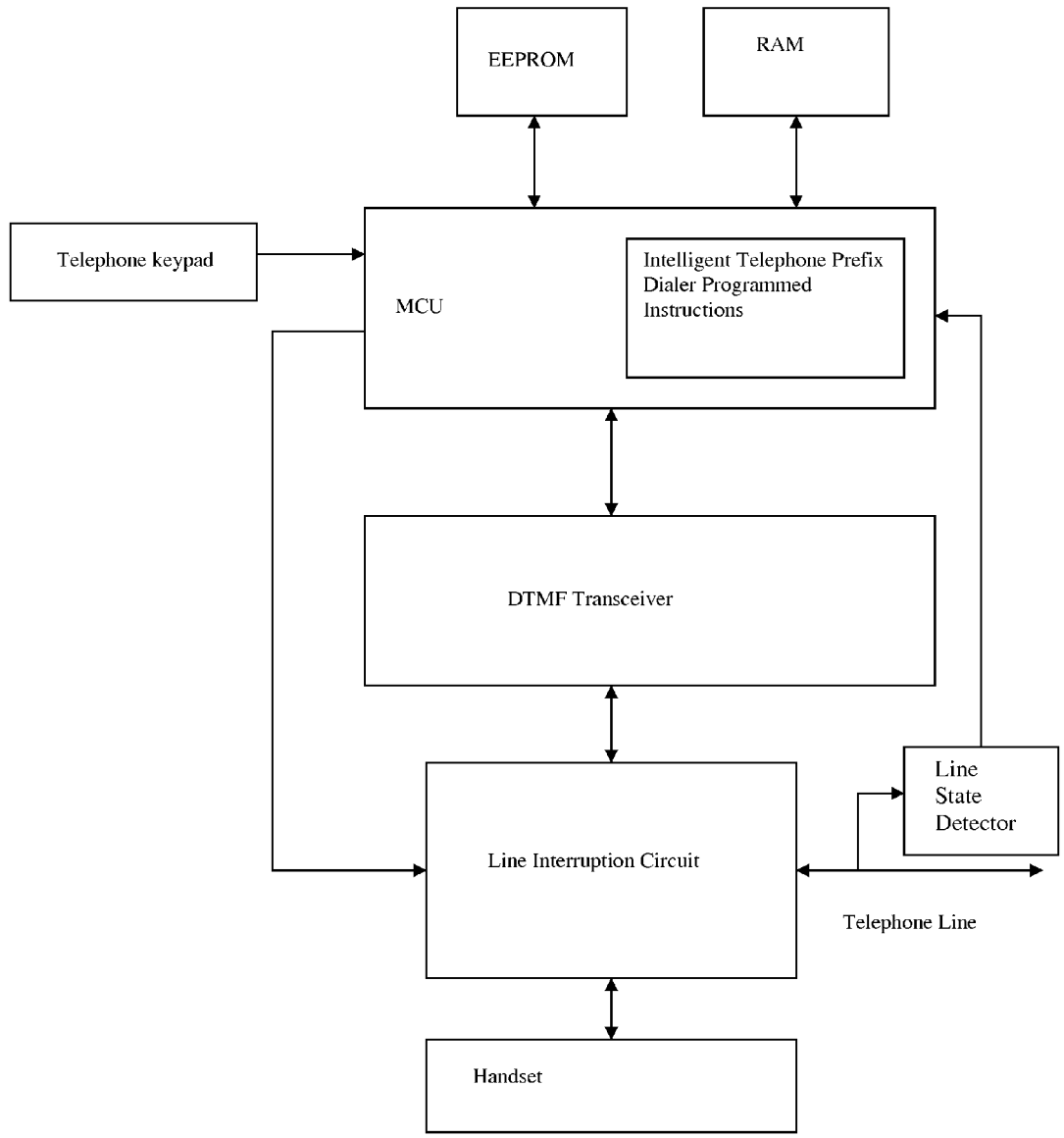
FIG. 3 is a schematic block diagram of an alternative embodiment of the inventive apparatus, integrated into a typical POTS, analog telephone set.
Figure 4:
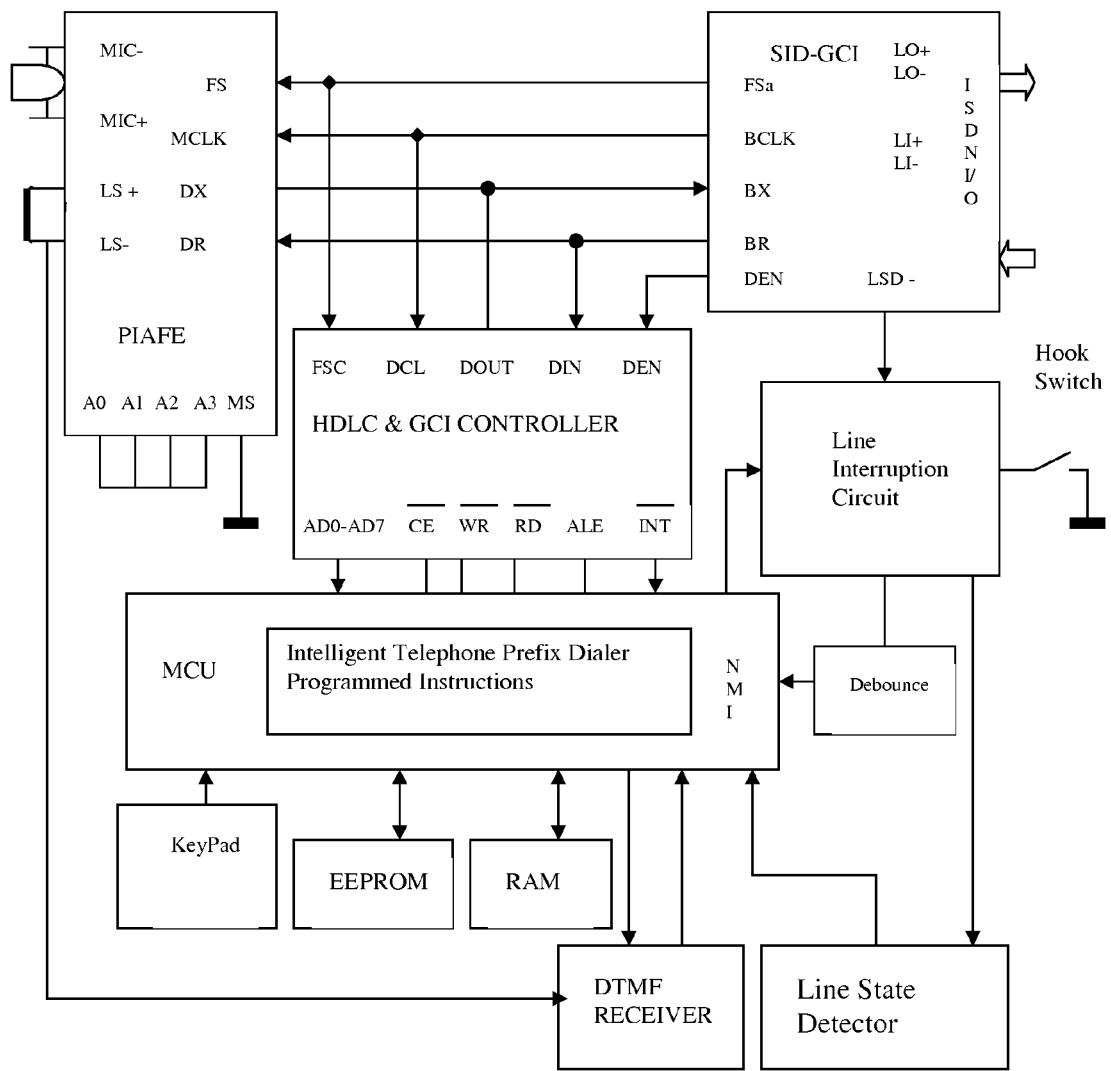
FIG. 4 is a schematic bloc diagram of an alternative embodiment of the inventive apparatus, integrated into a typical ISDN telephone set.

As shown in FIG. 3 and FIG. 4 the hardware and programmed instruction components detailed in FIGS. 2a, 2b, and 6a 6h may be integrated into an ISDN telephone set or an Analogue telephone set, and such implementation is within the scope of the principles described in this DETAILED DESCRIPTION OF THE INVENTION.

Advanced Intelligent Network (AIN) Embodiment

Figure 5:
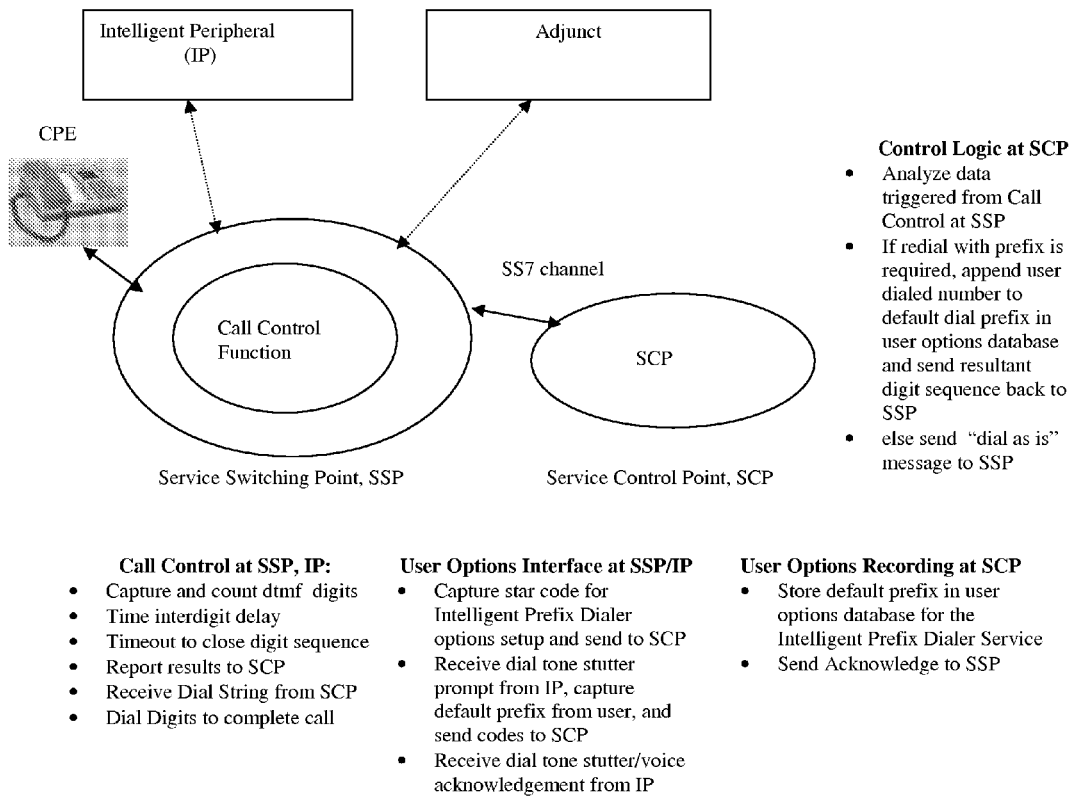
FIG. 5 is a schematic block diagram representing a further embodiment of the inventive method within the Service Provider's Advanced Intelligent Network, (AIN), equipment.

Referring to FIG. 5 for methodology references, and FIGS. 6a 6h for programmed instruction references, the intelligent telephone prefix dialer method may also be implemented in an Advanced Intelligent Network (AIN) environment. Background information related to AIN architecture is incorporated herein by reference; see "Advanced Intelligent Network Release 1 Network and Operations Plan", Special Report, SR-NPL-001623, Issue 1, June 1990, Bell Communications Research, also see "Advanced IntelligentNetworks—now a reality" by C. D. Sharp and K. Clegg, Electronics & Communication Engineering Journal, June 1994.

Note that the Service Switching Point (SSP) in FIG. 5 by definition has AIN Switch Capabilities. The Intelligent Peripheral (IP) and the Adjunct are shown for completeness of detail in that my invention may be implemented using the IP and the Adjunct in lieu of exclusive implementation in the SSP and SCP. The Adjunct is functionally equivalent to the SCP but uses a high speed communications channel separate and distinct from the SS7 channel communications between the SCP and the SSP.

The IP may be used to set up sophisticated interaction, e.g. voice interaction, between the subscriber and my invention, in lieu of the stutter dial tone communication shown in FIG. 5. The IP may also be used for the capturing and counting of subscriber dtmf digits in lieu of that functionality being implemented at the SSP.

The user options interface at either the SSP or the IP is responsive to a * code sent from the subscriber indicating that the subscriber wishes to store a default prefix dial string in the user options database in the SCP. Upon dial tone stutter initiated by the IP, the subscriber enters the desired prefix code followed by the # key. These digits are captured by the IP and then forwarded to the user options database via the SS7 channel between the SSP and the SCP.

Confirmation of the default dialing prefix is provided by a voice announcement to the subscriber over the telephone network initiated by the IP.

A variable containing the specified number of digits equaling; (The total number of digits required to complete the call—Number of default dialing prefix digits entered by user) is transmitted from the SSP to the SCP. This variable is recorded in the user options database. The control logic of my invention in the SCP will retrieve the variable containing the specified number of digits to determine whether to activate dialing after the digit capture logic of my invention has timed out.

Once the default dial prefix has been stored in the user options database in the SCP, the intelligent dialing functionality of my invention is prepared for activation. When the subscriber picks up the telephone, the SSP transmits a series of triggers to the SCP indicating call progress, including off-hook line condition, flash-hook line condition, and on-hook line condition. The SCP determines whether the intelligent dialing feature is present in the current subscriber's AIN features list. If yes, the SCP then determines that the intelligent dialing function is to be activated in the dtmf listen mode, and transmits the request to the SSP which is forwarded by the SSP to the IP.

Subsequently, the IP is tasked to capture, count, and timeout dtmf digits sent by the subscriber, while inhibiting those digits from going to the switch, (SSP). When digit capturing by the IP has timed out, such as when the subscriber finishes dialing a number and is no longer entering digits, the IP communicates the subscriber's dialing sequence to the SSP with instructions for the SSP to not complete the call at this time, but to forward the subscriber's dialing sequence to the SCP.

Upon receipt of the subscriber's dialing sequence from the SSP via the SS7 channel, my inventive method in the SCP counts the digits. If the number of digits dialed by the subscriber does not equal said specified number of digits, supra, the SCP transmits instructions back to the SSP to complete the call only with the subscriber's dialing sequence. If the number of digits dialed by the subscriber equals said specified number of digits, supra, the SCP, by means of the control logic of my inventive method, appends the digits dialed by the subscriber to said default dial prefix digits, supra, and temporarily stores the resultant digit sequence. The SCP then transmits the resultant digit sequence back to the SSP, with instructions for the SSP to complete the call using said resultant digit sequence. In accordance with said instructions from the SCP, the call is completed by the SSP. My inventive method then remains quiescent until the subscriber initiates a flash or other hook switch transition.

Note that the Service Switching Point (SSP) 25, (shown in FIG. 7), by definition has AIN Switch Capabilities. The Intelligent Peripheral (IP) 20 and the Adjunct 15 are shown for completeness of detail in that my invention may be implemented using the IP 20 and the Adjunct 15 in lieu of exclusive implementation in the SSP 25 and SCP 30. The Adjunct 15 is functionally equivalent to the SCP 30 but uses a high speed communications channel separate and distinct from the SS7 channel 35 communications between the SCP 30 and the SSP 25.

The IP 20 may be used to set up sophisticated interaction, e.g. voice interaction, between the subscriber, i.e., user, and the intelligent telephone prefix dialer, in lieu of the *code/stutter dial tone communication shown in FIG. 10. The IP 20 may also be used for the capturing and counting of subscriber dtmf digits in lieu of that functionality being implemented at the SSP 25.

The user options interface may be implemented at either the SSP 25 or the IP 20 and, as shown in FIG. 10 at step 90, can be responsive to a * code sent from the subscriber's equipment, i.e., Customer Premise equipment, such as telephone CPE, indicating that the subscriber wishes to store a default prefix dial string, e.g., area code, in a user options database 28 that may be resident within the SCP 30. As shown at step 95, the default prefix dial string may be sent to the SCP. As shown at steps 100, 110, and 115, upon dial tone stutter prompt initiated by the IP 20, the subscriber using telephone CPE enters the desired prefix code, e.g., area code, followed by the # key. These digits are captured by the IP 20 and then forwarded to the user options database 28 via the SS7 channel 35 between the SSP 25 and the SCP 30. As shown at step 120, confirmation, i.e., acknowledgment is received from the IP 20. As shown in FIG. 11, the storage process 135 of the default dialing prefix is followed by acknowledgment being sent to the SSP, as shown in step 140.

Additionally, confirmation of the default dialing prefix being successfully stored in the user options database 28 may be provided by a voice announcement to the subscriber over the telephone network, the voice announcement being initiated by the IP 20.

As most clearly shown in FIGS. 7 and 8, a call control function can be provided in the SSP 25 and the IP 20. As shown at step 40, the call control function can capture and count digits transmitted by the subscriber using a telephone such as telephone CPE (FIG. 7). Additionally, at step 45, an interdigit delay is timed so that the intelligent prefix dialer 10 can determine when the subscriber has ceased entering digits from the telephone CPE. At step 50, the user entered dialing sequence is closed upon timeout, i.e., when the interdigit delay has exceeded a predetermined value. At step 55, the timing results and digit sequence is reported to the SCP 30. The SCP processes the reported information so that when required the SCP can transmit a complete dial string that, as shown in step 60 is received by other AIN network elements, e.g., the SSP 25 and the IP 20. As shown at step 65, the AIN network elements in operable communication with the SCP 30 may then provide the necessary signaling to establish call connection based on the complete dial string.

It should be understood that a variable comprising the specified number of digits, i.e., the total number of digits required to complete the call, minus the number of default dialing prefix digits entered by the user may be transmitted from the SSP 25 to the SCP 30. This variable may be recorded in the user options database 28.

As shown in FIG. 9, the control logic of my invention can reside in the SCP 30 and can retrieve the variable containing the specified number of digits to determine whether to activate dialing after the digit capture logic, of my invention has timed out, i.e., as shown in step 70, the data triggered from Call Control within the SSP 25 is analyzed. As shown at branching step 75 if the default dial prefix is required, process step 80 is initiated to append the user dialed number to the default dial prefix so that a complete dial string is comprised of the default dial prefix and the user dialed number appended to the default dial prefix. Subsequently, at step 85, the complete dial string is sent to the SSP at step 85. As shown at branching step 77, if no default dial prefix is required, step 85 is executed while bypassing the appending procedure at step 80.

In summary of the aforementioned processes, once the default dial prefix has been stored in the user options database 28, the intelligent dialing functionality of my invention is prepared for activation. When the subscriber picks up the telephone, the SSP 25 transmits a series of triggers to the SCP 30 indicating call progress, including off-hook line condition, flash-hook line condition, and on-hook line condition. The SCP 30 determines whether the intelligent dialing feature is present in an AIN features list belonging to the current subscriber. If yes, the SCP 30 then determines that the intelligent dialing function is to be activated in the dtmf listen mode, and transmits the request to the SSP 25 which is forwarded by the SSP 25 to the IP 20.

Subsequently, the IP 20 is tasked to capture, count, and timeout dtmf digits sent by the subscriber, while inhibiting those digits from going to the switch, (SSP 25). When digit capturing by the IP 20 has timed out, such as when the subscriber finishes dialing a number and is no longer entering digits, the IP 20 communicates the subscriber's dialing sequence to the SSP 25 with instructions for the SSP 25 to not complete the call at this time, but to forward the subscriber's dialing sequence to the SCP 30. Upon receipt of the subscriber's dialing sequence from the SSP 25 via the SS7 channel, my inventive method in the SCP 30 counts the digits. If the number of digits dialed by the subscriber does not equal said specified number of digits, supra, the SCP 30 transmits instructions back to the SSP 25 to complete the call only with the subscriber's dialing sequence. If the number of digits dialed by the subscriber is equal to said specified number of digits, supra, the SCP 30, by means of the control logic of my inventive method, appends the digits dialed by the subscriber to said default dial prefix digits, supra, and temporarily stores the resultant digit sequence. The SCP 30 then transmits the resultant digit sequence back to the SSP 25, with instructions for the SSP 25 to complete the call using said resultant digit sequence. In accordance with said instructions from the SCP 30, the call is completed by the SSP 25. My inventive method then remains quiescent until the subscriber initiates a flash or other hook switch transition.

In order to provide for the selective dialing of long distance, or other dial strings which do not require the Nxx-xxxx dial sequence for call completion, the Intelligent Prefix Dialer 10 automatically inhibits itself from interrupting the subscriber initiated dial sequence thus allowing for successful call completion without intervention from the Intelligent Telephone Prefix Dialer 10. Thus the calling subscriber may dial 7 digits to complete the call, additionally, when the subscriber has entered more than three digits into the intelligent prefix dialer 10 as the pre-stored prefix code, the subscriber may dial less than 7 digits to complete the call.

It is to be understood that the present invention is not limited to the embodiment described above, but encompasses any and all embodiments within the scope of the following claims.

I claim;

1. A computer implemented telephone number dialing method, comprising the steps of:
   storing a predetermined valid number of telephone number digits required by a telephone network;
   accepting an area code into memory storage accessible by the computer, said area code being entered by a phone user and forming a default area code;
   accepting an abbreviated telephone number from the phone user;
   appending the abbreviated telephone number to the default area code only if the number of digits in the abbreviated telephone number entered by the phone user plus the number of digits in the default area code is equal to the predetermined valid number of telephone number digits, the appending step forming a complete telephone number; and
   placing the complete telephone number on said telephone network to establish a connection to a called party.

2. The computer implemented telephone number dialing method according to claim 1, further comprising displaying to the user the default area code entered by the user.

3. The computer implemented telephone number dialing method according to claim 1, wherein the predetermined valid number stored is ten.

4. The computer implemented telephone number dialing method according to claim 1, further comprising inhibiting said appending step while allowing the user entered telephone number digits to be placed on said telephone network to establish said connection to said called party when the number of area code digits plus the number of user entered digits does not equal the stored predetermined valid number.

5. The computer implemented telephone number dialing method according to claim 1, further comprising a voice announcement to the user, the voice announcement confirming the default area code entered by the user.

6. The computer implemented telephone number dialing method according to claim 1, further comprising accepting a caller ID block code as part of the default area code entered by the user.

7. The computer implemented telephone number dialing method according to claim 6, wherein the caller ID block code is a *67.

8. The computer implemented telephone number dialing method according to claim 1, further comprising accepting a caller ID send code as part of the default area code entered by the user.

9. The computer implemented telephone number dialing method according to claim 8, wherein the caller ID send code is a *82.

10. A non-transitory computer readable medium including software instructions, the non-transitory computer readable medium bearing said software instructions, wherein said software instructions are adapted to enable a computer system to perform an abbreviated dialing method comprising the steps of:
    storing a predetermined valid number of telephone number digits required by a telephone network;
    accepting an area code into memory storage accessible by the computer, said area code being entered by a phone user, and forming a default area code;
    accepting an abbreviated telephone number from the phone user;
    appending the abbreviated telephone number to the default area code only if the number of digits in the abbreviated telephone number entered by the phone user plus the number of digits in the default area code is equal to the predetermined valid number of telephone number digits, the appending step forming a complete telephone number; and
    placing the complete telephone number on said telephone network to establish a connection to a called party.

11. The non-transitory computer readable medium according to claim 10, further comprising software instructions adapted to enable the computer system to perform the step of displaying to the user the default area code entered by the user.

12. The non-transitory computer readable medium according to claim 10, wherein the predetermined valid number stored ten.

13. The non-transitory computer readable medium according to claim 10, further comprising automatically inhibiting said appending step while allowing the user entered telephone number digits to be placed on said telephone network to establish said connection to said called party when the number of area code digits plus the number of user entered digits does not equal the stored predetermined valid number.

14. The non-transitory computer readable medium according to claim 10, further comprising software instructions adapted to enable the computer system to perform the step of providing a voice announcement to the user, the voice announcement confirming the default area code entered by the user.

15. The non-transitory computer readable medium according to claim 10, further comprising software instructions adapted to enable the computer system to perform the step of accepting a caller ID block code as part of the default area code entered by the user.

16. The non-transitory computer readable medium according to claim 15, wherein the caller ID block code is a *67.

17. The non-transitory computer readable medium according to claim 10, further comprising software instructions adapted to enable the computer system to perform the step of accepting a caller ID send code as part of the default area code entered by the user.

18. The non-transitory computer readable medium according to claim 17, wherein the caller ID send code is a *82.

19. The non-transitory computer readable medium according to claim 11, wherein at least a portion of the abbreviated dialing computer system is disposed in the user's phone.

20. The non-transitory computer readable medium according to claim 11, wherein at least a portion of the abbreviated dialing computer system is disposed in a service provider's network equipment.

* * * * *

UNITED STATES PATENT AND TRADEMARK OFFICE
CERTIFICATE OF CORRECTION

Page 1 of 1

PATENT NO.         : 8,374,335 B2
APPLICATION NO.    : 11/526396
DATED              : February 12, 2013
INVENTOR(S)        : John L Breckenridge It is certified that error appears in the above-identified patent and that said Letters Patent is hereby corrected as shown below:

In the Specification

Col. 6, line 3: replace '--' with a '-'

In the Claims

Col. 10, line 13: replace 'stored ten' with 'stored is ten'

Signed and Sealed this
Thirteenth Day of August, 2013

Teresa Stanek Rea
*Acting Director of the United States Patent and Trademark Office*